(12) United States Patent
Song

(10) Patent No.: US 9,067,551 B2
(45) Date of Patent: Jun. 30, 2015

(54) APPARATUS FOR OPENING AND CLOSING SIDE SKIRT OF TRUCK

(71) Applicant: Hyundai Motor Company, Seoul (KR)

(72) Inventor: Won Kyu Song, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 48 days.

(21) Appl. No.: 14/102,859

(22) Filed: Dec. 11, 2013

(65) Prior Publication Data
US 2015/0069784 A1    Mar. 12, 2015

(30) Foreign Application Priority Data

Sep. 12, 2013 (JP) .......................... 10-2013-0109486

(51) Int. Cl.
| | |
|---|---|
| *B60R 19/38* | (2006.01) |
| *B60J 5/04* | (2006.01) |
| *B62D 35/00* | (2006.01) |
| *E05B 81/02* | (2014.01) |
| *E05B 83/02* | (2014.01) |
| *E05B 85/04* | (2014.01) |

(52) U.S. Cl.
CPC ............... *B60R 19/38* (2013.01); *B60J 5/0497* (2013.01); *B62D 35/001* (2013.01); *E05B 81/02* (2013.01); *E05B 83/02* (2013.01); *E05B 85/04* (2013.01)

(58) Field of Classification Search
CPC ........ B60R 19/38; B62D 35/00; E05B 83/02; E05B 81/02; B60J 5/04
USPC ........... 296/180.2, 180.1, 180.4, 193.03, 191; 293/126, 128, 154
See application file for complete search history.

(56) References Cited

FOREIGN PATENT DOCUMENTS

| | | |
|---|---|---|
| JP | 7-162785 | 6/1995 |
| JP | 2013-119302 | 6/2013 |
| KR | 10-0097882 B1 | 1/1996 |
| KR | 10-0207196 B1 | 4/1999 |

*Primary Examiner* — Joseph D Pape
*Assistant Examiner* — Dana Ivey
(74) *Attorney, Agent, or Firm* — Morgan, Lewis & Bockius LLP

(57) ABSTRACT

An apparatus for opening and closing a side skirt of a truck may include a bracket, a striker, an upper bracket, through which a first push button hole is formed, a main plate having a first plate through which a second push hole is formed and a pair of second plates integrally formed with the first plate; a push button inserted and mounted to the first push button hole of the upper bracket and the second push button hole of the main plate; a latch pivotally connected to a rear end of the push button and rotatably mounted between the second plates of the main plate, a locking spring connected to a lower end of the first plate of the main plate, and a hinge unit that serves as a center of rotation about which an upper end portion of the side skirt is rotated outward.

7 Claims, 6 Drawing Sheets

APPARATUS FOR OPENING AND CLOSING SIDE SKIRT OF TRUCK

CROSS-REFERENCE TO RELATED APPLICATION

The present application claims priority to Korean Patent Application No. 10-2013-0109486, filed on Sep. 12, 2013, the entire contents of which is incorporated herein for all purposes by this reference.

BACKGROUND OF THE INVENTION

1. Field of the Invention

The present invention relates to an apparatus for opening and closing a side skirt of a truck, and more particularly, to an apparatus for opening and closing a side skirt of a truck which can easily open and close the side skirt mounted to a side of a loading frame of the truck.

2. Description of Related Art

In general, various types of tanks including a fuel tank, an air tank, and the like are installed in a lower frame of a loading part among a vehicle body frame of a truck, and a side skirt is applied to a side of the lower frame for protection of the tanks.

For example, the fuel tank of the truck preserves fuel therein and requires strength sufficient to cope with an external force such as a collision, and it is necessary in a case of a vehicle crash to prevent the fuel tank from being damaged due to external factors including a distortion of a vehicle body and thus minimize damage of an accident.

According to the need, a side skirt in a plate shape is installed at a side of the vehicle body frame of the truck to protect the tanks from the outside.

Further, in recent years, Urea, which is an auxiliary fuel, has been frequently used to reduce exhaust gas of diesel vehicles, and a tank for storing the Urea is also installed in the truck and is protected by the side skirt.

In a case of a tractor among heavy-duty trucks, the Urea is injected during fuel injection, and the side skirt should be separated for ensuring an approaching space of an injection gun, in which case separate tools are used and a lot of maintenance time is consumed.

For example, as shown in FIG. 1, a tank assembly 200 including a fuel tank as well as an air tank 201 and a urea tank 202 is installed at a side of a vehicle body frame 100, and a ladder & guard rail assembly 102 serving as a side skirt is installed at an outside of the tank assembly 200 through bolt fastening.

Accordingly, as shown in FIG. 2, for injecting the Urea into the Urea tank 202 of the tank assembly 200, two bolt fastened portions 203 of the ladder & guard rail assembly 102 should be loosened by using a separate tool 204, and after injecting the Urea, the bolt fastened portions should be tightened again by using the separate tool 204, so that a worker or a driver is inconvenienced by the use of the tool, and a lot of maintenance time is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for opening and closing a side skirt of a truck which enables a side skirt installed in a vehicle body frame of a loading part of a truck for protection of various tanks to be easily opened and closed through one-touch method, so that reduction of time spent for fuel injection related working such as easily attaching/detaching the side skirt and convenience of maintenance can be achieved.

In an aspect of the present invention, an apparatus for opening and closing a side skirt of a truck, may include a bracket for the side skirt that is integrally connected to a vehicle body frame and supports a tank assembly, a striker that is mounted to an upper inner side of the side skirt, an upper bracket, through which a first push button hole is formed, the upper bracket being integrally assembled to an upper end portion of the bracket for the side skirt, a main plate that may include a first plate through which a second push hole is formed forward and rearward at a central position and which is attached and assembled to an outer surface of the upper bracket, and a pair of second plates that are integrally formed with the first plate to be perpendicular to an outer surface of the first plate for locking the striker, a push button that is inserted and mounted to the first push button hole of the upper bracket and the second push button hole of the main plate, a latch that is pivotally connected to a rear end of the push button, is rotatably mounted between the second plates of the main plate, and primarily locks or unlocks the striker, a locking spring that is connected to a lower end of the first plate of the main plate, and configured for secondarily locking or unlocking the striker by using a resilient force thereof, and a hinge unit that serves as a center of rotation about which an upper end portion of the side skirt is rotated outward, and hingedly couples a lower end portion of the side skirt to a lower end portion of the bracket for the side skirt.

A spring supported by a front surface of the first plate of the main plate is mounted to a front end portion of the push button, and a slide pin is integrally formed with opposite ends of a rear end portion of the push button.

Slide holes through which a slide pin of the push button slides forward and rearward along the slide holes are formed through the second plates of the main plate.

An upper end portion of the latch is coupled with a slide pin of the push button, wherein a lower end portion of the latch is rotatably coupled to the second plates through a hinge pin, and wherein a locking recess for locking the striker is formed at a portion extending outward from the lower end portion of the latch.

An upper end portion of the locking spring is integrally with the lower end of the first plate, wherein a lower end portion of the locking spring is configured with a resilient force providing end that is bent in an arch shape, and wherein a locking end for secondarily locking the striker is bent upward from a tip end of the resilient force providing end.

The hinge unit may include a hinge rod that is formed at the lower end portion of the bracket for the side skirt, and a hinge end that may have a reverse 'U' shaped section and is integrally formed with a lower inner side of the side skirt to cover the hinge rod such that the hinge rod is inserted into and coupled to the hinge end.

The present invention provides the following effect through the above-described apparatus and method for solving the problems.

According to embodiments of the present invention, the side skirt can be easily separated and attached in one-touch manner through a push button, so that injection of a fuel such as Urea and maintenance can be conveniently performed.

Time spent for injecting an auxiliary fuel can be reduced and a driver can be provided with convenience through a one-touch separation structure.

The side skirt is easily separated and attached so that components around a frame can be conveniently maintained.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
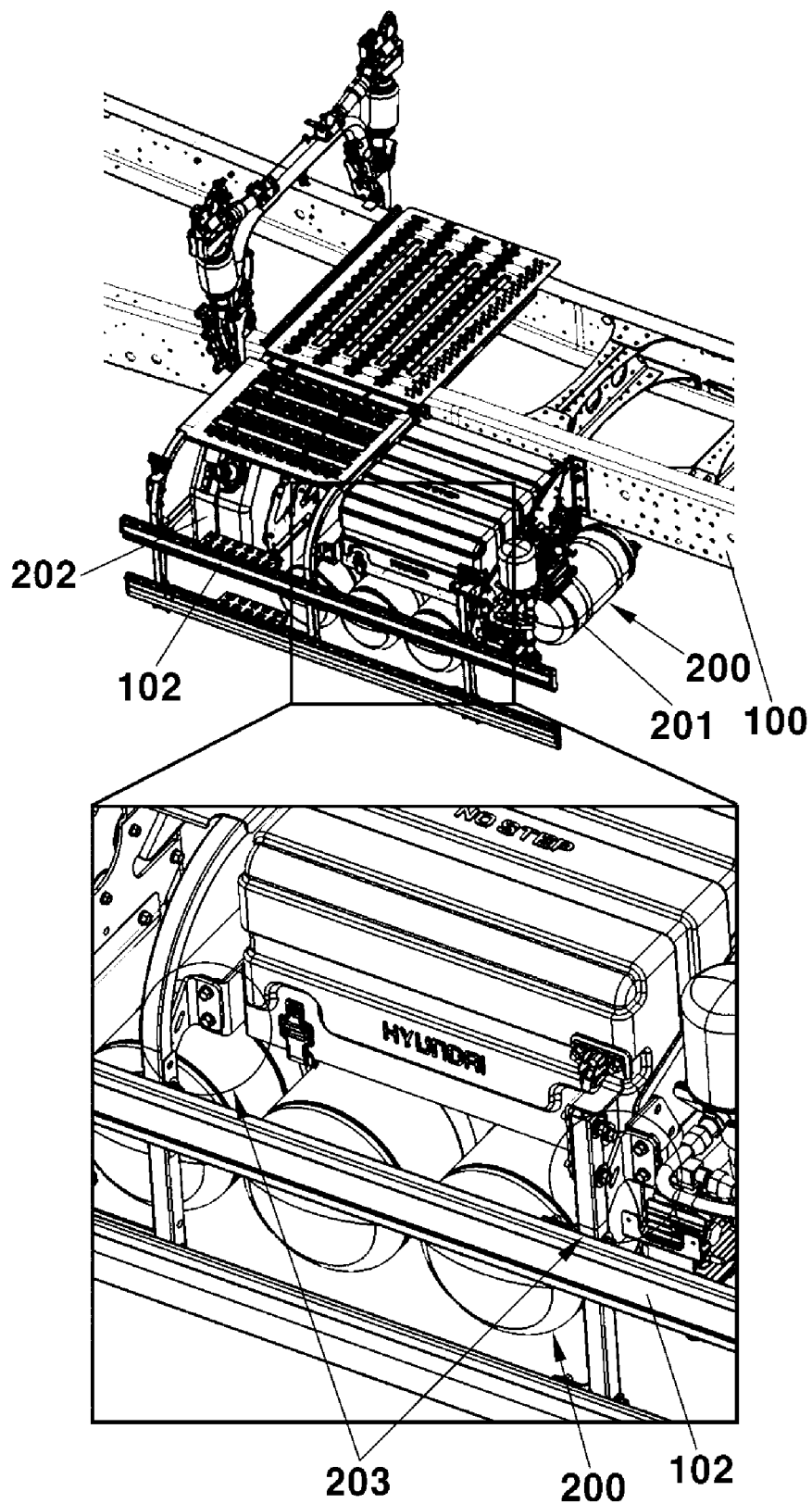
FIG. 1 shows a state in which a ladder and guard rail assembly as a side skirt according to the related art is installed.
Figure 2:
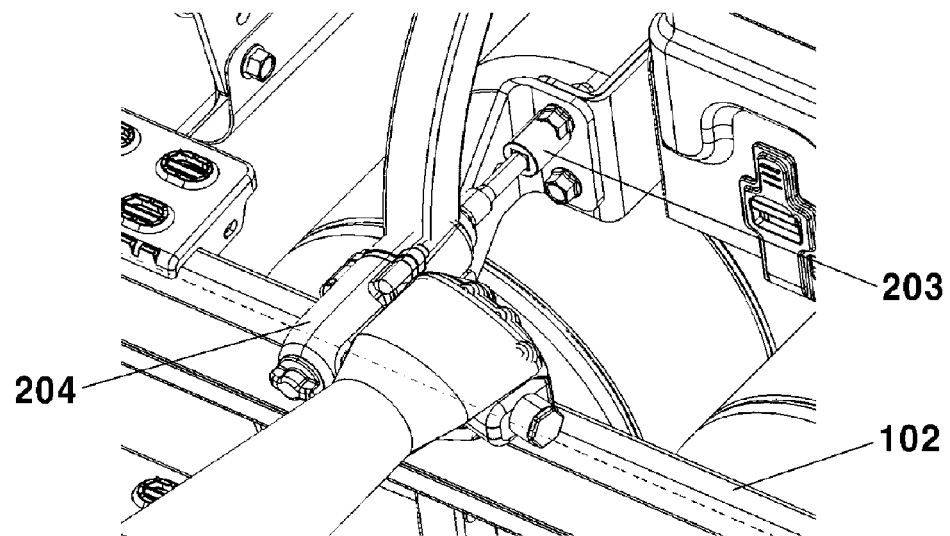
FIG. 2 shows a method of attaching and detaching the side skirt according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to the accompanying drawings.

Figure 3:
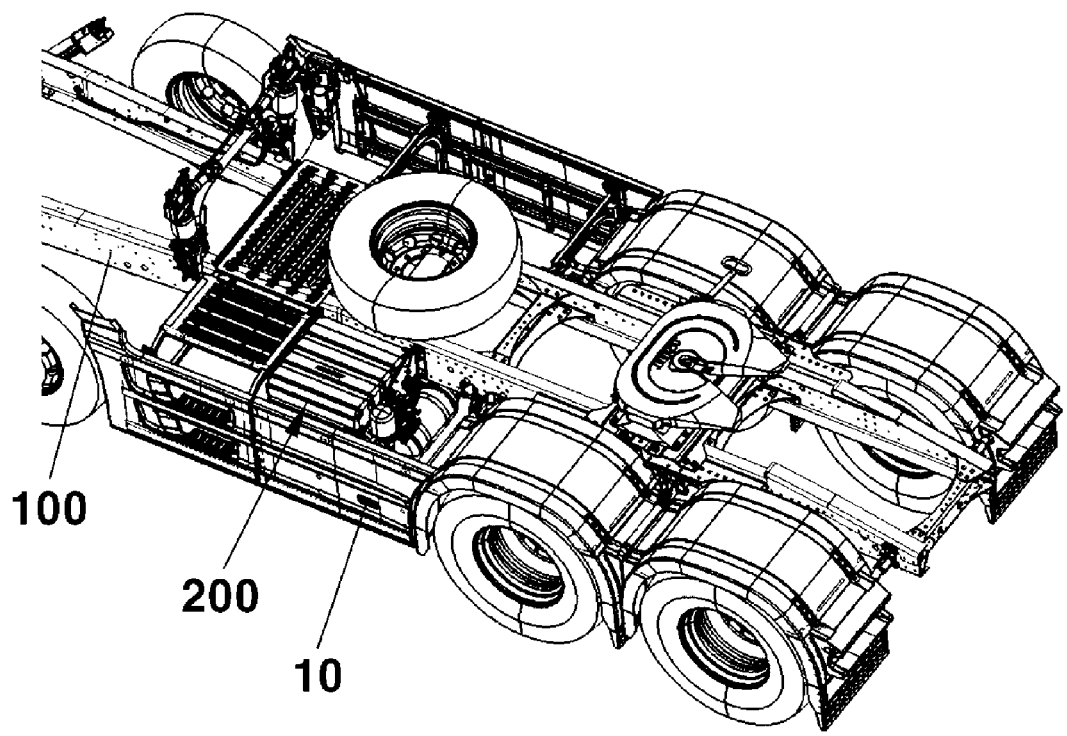
FIG. 3 shows a state in which a side skirt according to an exemplary embodiment of the present invention is installed.

As shown in FIG. 3, a side skirt 10 is a unit for protecting a tank assembly 200 installed at a lower side of a vehicle body frame 100 from the outside, and brackets 110 for the side skirt that support opposite sides of the tank assembly 200 are integrally connected with the vehicle body frame 100.

The side skirt 10 according to an exemplary embodiment of the present invention is configured with a rectangular plate structure that hides the tank assembly 200 to protect the tank assembly 200 from the outside, and is installed with a structure in which a driver or a worker can easily open/close the side skirt 10 to inject an auxiliary fuel into various tanks (in particular, a urea tank) of the tank assembly 200.

That is, the present invention is focused on easily performing injection of an auxiliary fuel and maintenance while the various tanks are exposed to the outside, by making the side skirt 10 easily opened through rotating the side skirt 10 forward (toward an outside of the vehicle body) about a hinge point at a lower portion of the side skirt 10 in a state in which an upper portion of the side skirt 10 is locked by using a striker which will be described below.

Figure 5:
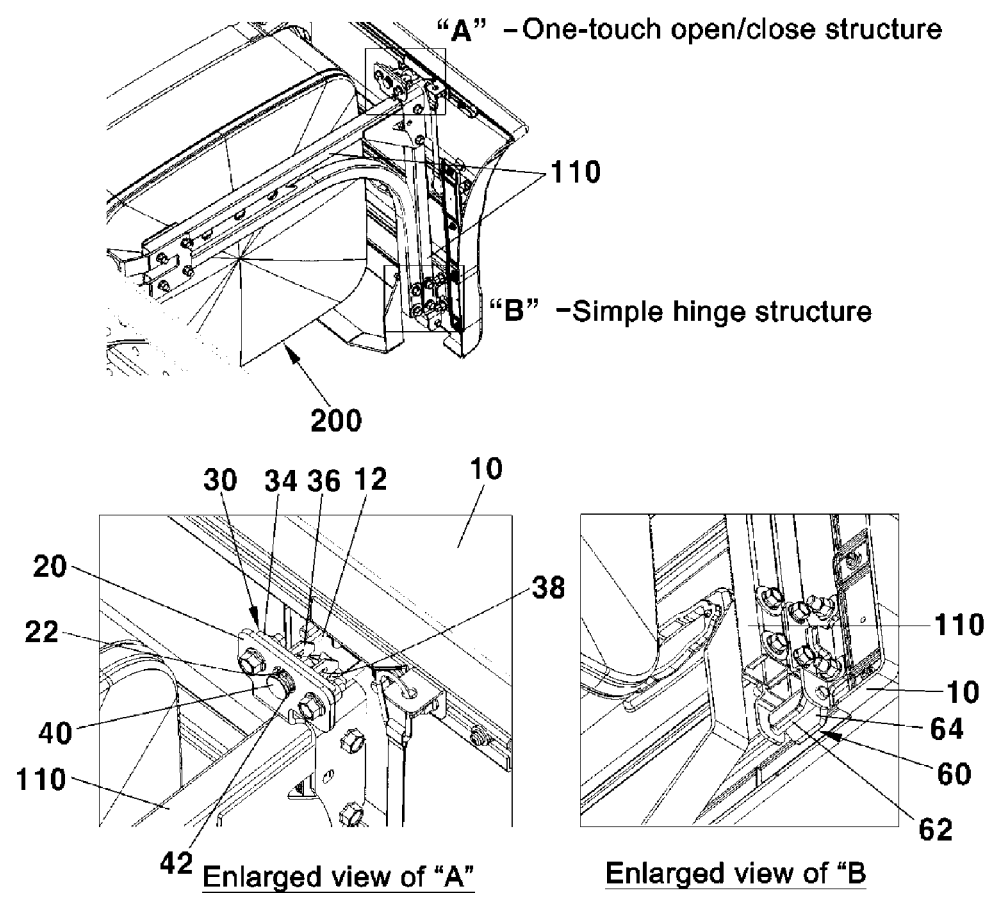
FIG. 5 shows a state in which the apparatus for opening and closing the side skirt according to the exemplary embodiment of the present invention is installed.

To this end, as shown in FIG. 5, a striker 12 in a rectangular ring shape is integrally attached to an upper inner side of the side skirt 10, and a hinge end 64 with a reverse 'U' shaped section is integrally attached to a lower inner side of the side skirt 10 to serve as a hinge point of the side skirt.

Further, configurations for locking and unlocking the striker 12 are intensively installed at an upper end portion of the corresponding bracket 110 for the side skirt, and a hinge rod 62 that is covered with the hinge end 64 of the side skirt 10 and is fitted with and coupled to the hinge end 64 is integrally attached to a lower end portion of the bracket 110 for the skirt.

Figure 4A:
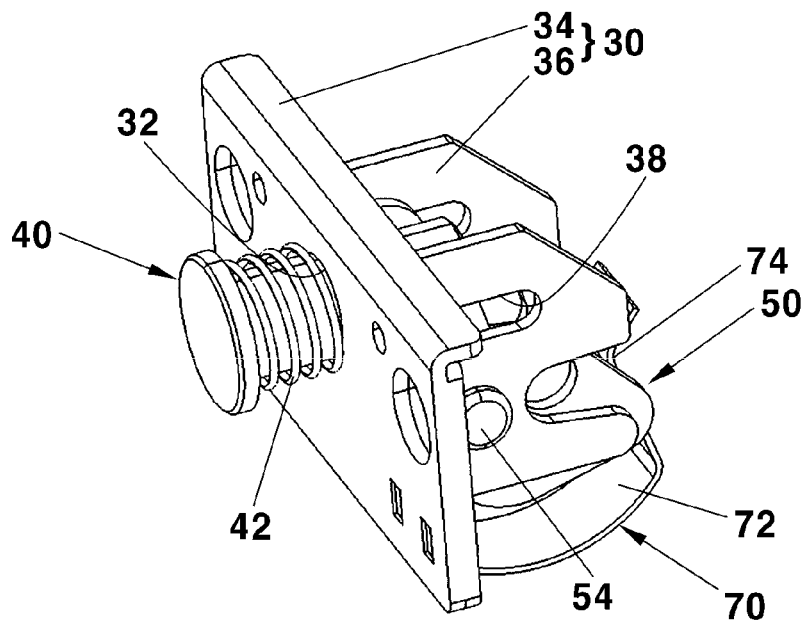
FIGS. 4A and 4B are a perspective view showing an apparatus for opening and closing a side skirt according to an exemplary embodiment of the present invention.
Figure 4B:
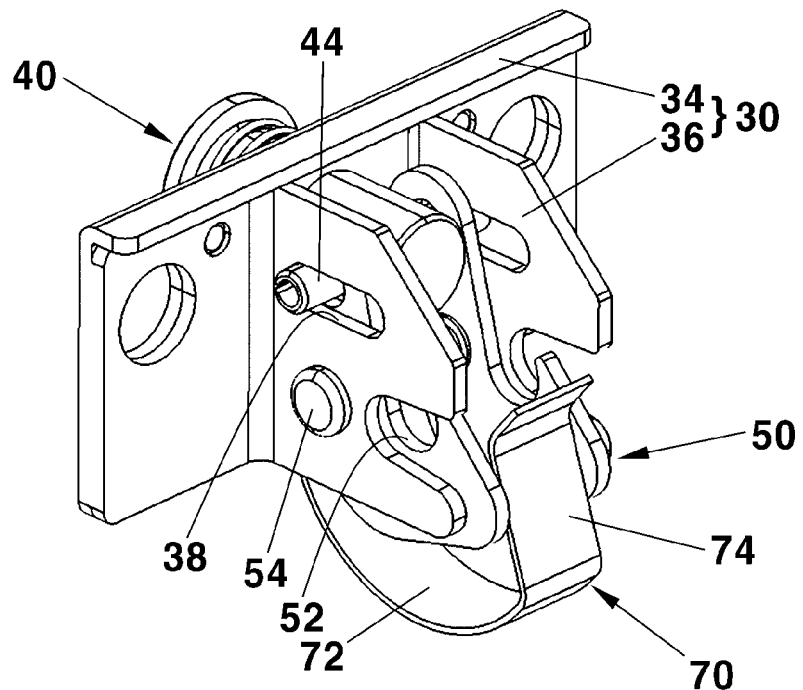

Hereinafter, the configurations for locking and unlocking the striker will be described with reference to FIGS. 4A, 4B, and 5.

An upper bracket 20 that includes upper and lower vertical plates and serves as a skeleton body is mounted to the upper end portion of the bracket 110 for the side skirt, in which the configurations for locking and unlocking the striker are connected to the upper vertical plate of the upper bracket 20, and the lower vertical plate is integrally assembled to the bracket 110 for the side skirt.

A first push button hole 22 through which a push button 40 to be described below passes is formed through a central portion of the upper vertical plate of the upper bracket.

A main plate 30 is attached and assembled to an outer surface of the upper bracket 20 mounted to the bracket 110 for the side skirt, in which the main plate 30 includes a first plate 34 in a vertical plate shape that is attached and assembled to the outer surface of the upper bracket 20, latches that are integrally formed to be symmetric, are located on an outer surface side of the first plate 34, and lock/unlock the striker to be described below, and second plates 36 in a vertical plate shape that support a locking spring.

A second push button hole 32 corresponding with the first push button hole 22 is formed through a central portion of the first plate 34 of the main plate 30.

A front end portion of the push button 40 is formed of a disk knob with a large diameter, and a rear end portion of the push button 40 is formed in a circular rod shape and is inserted into and passes through the first push button hole 22 of the upper bracket 20 and the second push button hole 32 formed in the first plate 34 of the main plate 30. A spring 42 is inserted and disposed between the disk knob of the push button 40 and a front surface of the first plate 34 such that the push button 40 returns to an original position when being released.

Slide pins 44 are integrally formed with opposite sides of the circular rod shaped rear end portion of the push button 40, and slide holes 38 through which the slide pins 44 of the push button 40 slide forward and rearward are formed through the second plates 36 of the main plate 30.

The latches 50 are located between the second plates 36 of the main plate 30, are rotatably coupled to the rear end portion of the push button 40, and primarily lock or unlock the striker 12.

More specifically, an upper end portion of the latches 50 is slidably coupled with the slide pins 44 of the push button 40 inserted into the slide holes 38 of the second plates 36, and a lower end portion of the latches 50 is rotatably coupled to the second plates 36 through hinge pins 54. An open-topped locking recess 52 for primarily locking the striker 12 is formed at a portion extending outward from the lower end portion of the latches 50.

A locking spring 70 that secondarily locks or unlocks the striker 12 by using a resilient force is integrally connected to a lower end of the first plate 34 of the main plate 30.

That is, an upper end portion of the locking spring 70 is integrally connected to the lower end of the first plate 34, and a lower end portion of the locking spring 70 is formed of a resilient force providing end 72 that is bent in an arch shape, and when bearing a downward force, applies a resilient restoring force in an opposite direction to the downward force while being tensioned. A locking end 74 is bent upward from the tip end of the resilient force providing end 72, and holds and secondarily locks the striker 12 separated from the latches 50.

Meanwhile, as a center of rotation about which the upper end portion of the side skirt 10 is rotated outward, and as a hinge unit 60 that hingedly couples the lower end portion of the side skirt 12 to the lower end portion of the bracket 110 for the side skirt, as described above, the hinge end 64 with the reverse 'U' shaped section is integrally attached to the lower inner side of the side skirt 10, and the hinge rod 62 that is covered with the hinge end 64 of the side skirt 10 and is fitted with and coupled to the hinge end 64 is integrally attached to the lower end portion of the bracket 110 for the skirt.

Figure 6:
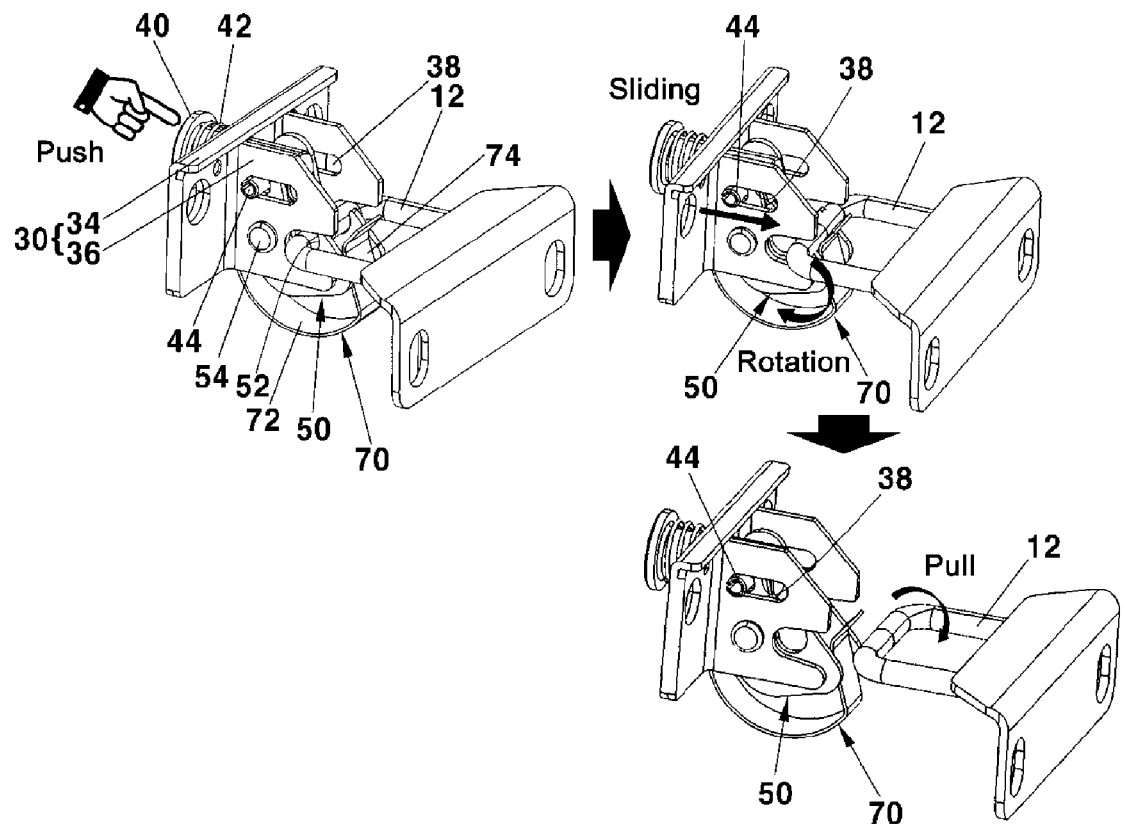
FIG. 6 shows an operation state of the apparatus for opening and closing the side skirt according to the exemplary embodiment of the present.
Figure 7:
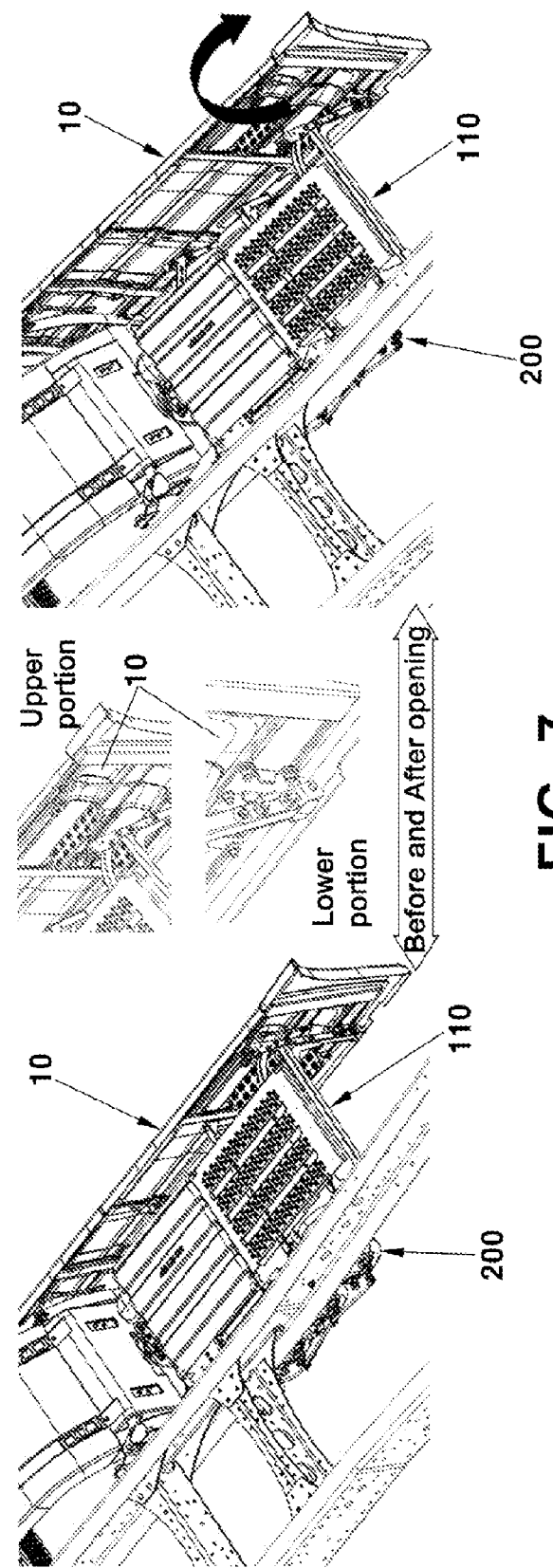
FIG. 7 shows a state in which the side skirt according to the exemplary embodiment of the present invention is opened and closed.

Hereinafter, an operation of the above-configured apparatus for opening and closing the side skirt according to the exemplary embodiment of the present will be described with reference to FIGS. 6 and 7.

First, when the push button 40 is pushed toward the outside of a vehicle, the push button 40 moves forward while compressing the spring 42, and at the same time, the slide pins 44 of the push button 40 linearly moves forward along the slide holes 38 of the second plates 36.

At the same time, the upper end portion of the latches 50 coupled with the slide pins 44 of the push button 40 bears the forward force of the slide pins 44. Thus, the upper end portion of the latches 50 rotates downward about lower hinge points of the latches 50 hingedly coupled to the second plates 36 through the hinge pins 54, and the locking recess 52 extending outward from the lower end portion of the latches 50 also rotates downward about the lower hinge points of the latches 50.

At this time, since the striker 12 of the side skirt 10 has been inserted into and locked to the locking recess 52 of the latches, i.e., the open-topped locking recess 52 for primarily locking the striker 12, when the locking recess 52 of the latches 50 rotates downward, the striker can be unlocked through the opened top of the locking recess 52.

Accordingly, when the upper end portion of the side skirt 10 is rotated about the hinge point at the lower end portion of the side skirt 10 while being pulled a bit toward the outside of the vehicle body, a primary unlocking by which the striker escapes from the locking recess 52 of the latches 50 is made.

Although the primary unlocking has been made as described above, the striker 12 is supported by the resilient force providing end 72 and the locking end 74 of the locking spring for safety, and therefore complete unlocking (complete opening) of the side skirt 10 is not made.

Accordingly, if a worker pulls the side skirt 10 a little further toward the outside of the vehicle body, the striker 12 pushes the locking end 74 of the locking spring 70 outward, and at the same time the resilient force providing end 72 is tensioned, so that a secondary unlocking by which the striker 12 completely escapes from the locking end 74 is made, thereby making it possible to completely unlock (completely open) the side skirt 10.

Thereafter, when the upper end portion of the side skirt 10 is rotated outward and at the same time is pulled upward, the hinge rod 62 of the side skirt 10 escapes from the hinge end 64 of the bracket 110 for the side skirt, so that the side skirt 10 can be easily separated from the bracket 110, thereby ensuring approaching space of an injection gun for injecting an auxiliary fuel into the tank assembly, and securing a space for maintenance.

Unlike the related art in which the side skirt is attached and detached through coupling and separating a bolt by using a separate tool, as described above, the side skirt can be easily separated and attached in one-touch manner using a push button so that fuel injection and maintenance can be conveniently performed.

Meanwhile, if attached in a reverse order of the separation, the side skirt 10 can be easily attached in the same way.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a side skirt of a truck, the apparatus comprising:

a bracket for the side skirt that is integrally connected to a vehicle body frame and supports a tank assembly;

a striker that is mounted to an upper inner side of the side skirt;

an upper bracket, through which a first push button hole is formed, the upper bracket being integrally assembled to an upper end portion of the bracket for the side skirt;

a main plate that includes:

a first plate through which a second push hole is formed forward and rearward at a central position and which is attached and assembled to an outer surface of the upper bracket; and a pair of second plates that are integrally formed with the first plate to be perpendicular to an outer surface of the first plate for locking the striker;

a push button that is inserted and mounted to the first push button hole of the upper bracket and the second push button hole of the main plate;

a latch that is pivotally connected to a rear end of the push button, is rotatably mounted between the second plates of the main plate, and primarily locks or unlocks the striker;

a locking spring that is connected to a lower end of the first plate of the main plate, and configured for secondarily locking or unlocking the striker by using a resilient force thereof; and a hinge unit that serves as a center of rotation about which an upper end portion of the side skirt is rotated outward, and hingedly couples a lower end portion of the side skirt to a lower end portion of the bracket for the side skirt.

2. The apparatus of claim 1, wherein a spring supported by a front surface of the first plate of the main plate is mounted to a front end portion of the push button, and a slide pin is integrally formed with opposite ends of a rear end portion of the push button.

3. The apparatus of claim 1, wherein slide holes through which a slide pin of the push button slides forward and rearward along the slide holes are formed through the second plates of the main plate.

4. The apparatus of claim 2, wherein slide holes through which the slide pin of the push button slides forward and rearward along the slide holes are formed through the second plates of the main plate.

5. The apparatus of claim 1,
wherein an upper end portion of the latch is coupled with a slide pin of the push button,
wherein a lower end portion of the latch is rotatably coupled to the second plates through a hinge pin, and
wherein a locking recess for locking the striker is formed at a portion extending outward from the lower end portion of the latch.

6. The apparatus of claim 1,
wherein an upper end portion of the locking spring is integrally with the lower end of the first plate,
wherein a lower end portion of the locking spring is configured with a resilient force providing end that is bent in an arch shape, and
wherein a locking end for secondarily locking the striker is bent upward from a tip end of the resilient force providing end.

7. The apparatus of claim 1, wherein the hinge unit comprises a hinge rod that is formed at the lower end portion of the bracket for the side skirt, and a hinge end that has a reverse 'U' shaped section and is integrally formed with a lower inner side of the side skirt to cover the hinge rod such that the hinge rod is inserted into and coupled to the hinge end.

* * * * *